(12) United States Patent
Kim et al.

(10) Patent No.: US 10,078,607 B2
(45) Date of Patent: Sep. 18, 2018

(54) BUFFER MANAGEMENT METHOD AND APPARATUS FOR UNIVERSAL SERIAL BUS COMMUNICATION IN WIRELESS ENVIRONMENT

(71) Applicants:Samsung Electronics Co., Ltd., Gyeonggi-do (KR); Ajou University Industry-Academic Cooperation Foundation, Gyeonggi-do (KR)

(72) Inventors: Jun-Hyung Kim, Gyeonggi-do (KR); Young-Bae Ko, Gyeonggi-do (KR); Jong-Hyo Lee, Gyeonggi-do (KR); Keun-Woo Lim, Gyeonggi-do (KR); Woo-Sung Jung, Gyeonggi-do (KR); Joo-Yeol Lee, Gyeonggi-do (KR)

(73) Assignees: Sasmung Electronics Co., Ltd (KR); Ajou University Industry-Academic Cooperation Foundation (KR)

( * ) Notice: Subject to any disclaimer, the term of this patent is extended or adjusted under 35 U.S.C. 154(b) by 137 days.

(21) Appl. No.: 15/033,841

(22) PCT Filed: Feb. 13, 2014

(86) PCT No.: PCT/KR2014/001174
§ 371 (c)(1),
(2) Date: May 2, 2016

(87) PCT Pub. No.: WO2015/064850
PCT Pub. Date: May 7, 2015

(65) Prior Publication Data
US 2016/0267037 A1   Sep. 15, 2016

(30) Foreign Application Priority Data
Oct. 31, 2013  (KR) .................. 10-2013-0131486

(51) Int. Cl.
*G06F 13/38* (2006.01)
*G06F 5/14* (2006.01)
(Continued)

(52) U.S. Cl.
CPC .......... *G06F 13/385* (2013.01); *G06F 3/0656* (2013.01); *G06F 5/12* (2013.01);
(Continued)

(58) Field of Classification Search
CPC . G06F 3/0656; G06F 5/12; G06F 5/14; G06F 2205/126
(Continued)

(56) References Cited

U.S. PATENT DOCUMENTS 6,912,651 B1 * 6/2005 Hamdi .................. G06F 13/385
345/163
7,702,825 B2   4/2010 Howard
(Continued)

FOREIGN PATENT DOCUMENTS

WO   WO 2012/177877   12/2012
WO   WO 2013/147789   10/2013

OTHER PUBLICATIONS

PCT/ISA/210 Search Report issued on PCT/KR2014/001174 (pp. 3).

*Primary Examiner* — Glenn Allen Auve
(74) *Attorney, Agent, or Firm* — The Farrell Law Firm, P.C.

(57) ABSTRACT

The present disclosure provides a method for managing buffers of a device for Universal Serial Bus (USB) communication in a wireless environment. The method includes determining respective current data storage levels of transmit buffers that store different types of data for USB communication; comparing the respective current data storage levels of the transmit buffers with corresponding respec-
(Continued)

tive predetermined threshold levels; and controlling an input rate or output rate of a first transmit buffer if it is determined based on the comparison that the first transmit buffer has a current data storage level that exceeds a predetermined threshold level.

12 Claims, 7 Drawing Sheets

(51) Int. Cl.
*G06F 3/06* (2006.01)
*G06F 5/12* (2006.01)
*H04L 12/835* (2013.01)
*G06F 13/16* (2006.01)
*G06F 13/24* (2006.01)

(52) U.S. Cl.
CPC ............ *G06F 5/14* (2013.01); *G06F 13/1673* (2013.01); *G06F 13/24* (2013.01); *H04L 47/30* (2013.01); *G06F 2205/126* (2013.01); *G06F 2213/0042* (2013.01); *G06F 2213/3812* (2013.01); *G06F 2213/3814* (2013.01)

(58) Field of Classification Search
USPC .......................................................... 710/57
See application file for complete search history.

(56) References Cited

U.S. PATENT DOCUMENTS

| | | | |
|---|---|---|---|
| 8,200,856 B2 | 6/2012 | Guo et al. | |
| 8,200,858 B1* | 6/2012 | Shor | H04L 12/40032 710/2 |
| 2002/0034273 A1 | 3/2002 | Spence et al. | |
| 2003/0120367 A1 | 6/2003 | Chang et al. | |
| 2006/0277330 A1* | 12/2006 | Diepstraten | H04L 47/6215 710/40 |
| 2007/0038784 A1 | 2/2007 | Sung et al. | |
| 2008/0183920 A1* | 7/2008 | Jiang | G06F 13/426 710/53 |
| 2009/0172210 A1* | 7/2009 | Kesselman | H04L 47/805 710/16 |
| 2009/0245446 A1 | 10/2009 | Hsieh et al. | |
| 2014/0047141 A1* | 2/2014 | Sadeghi | G06F 13/4291 710/56 |
| 2014/0140258 A1* | 5/2014 | Sadeghi | H04L 47/39 370/312 |

* cited by examiner

[Fig. 1]
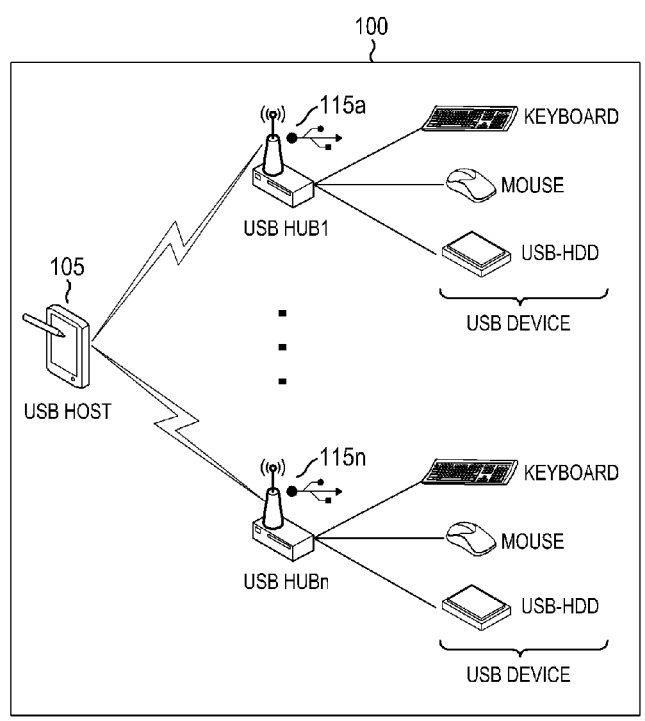

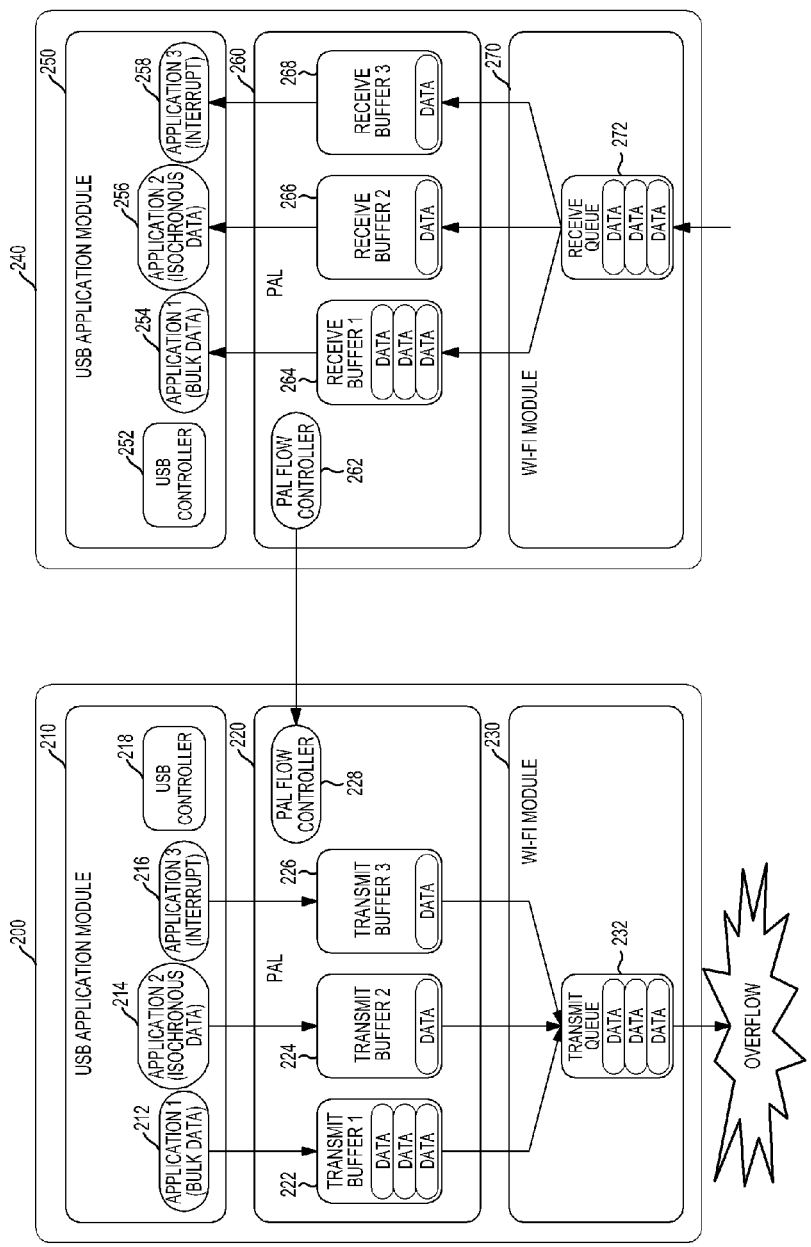
[Fig. 2]

[Fig. 3]
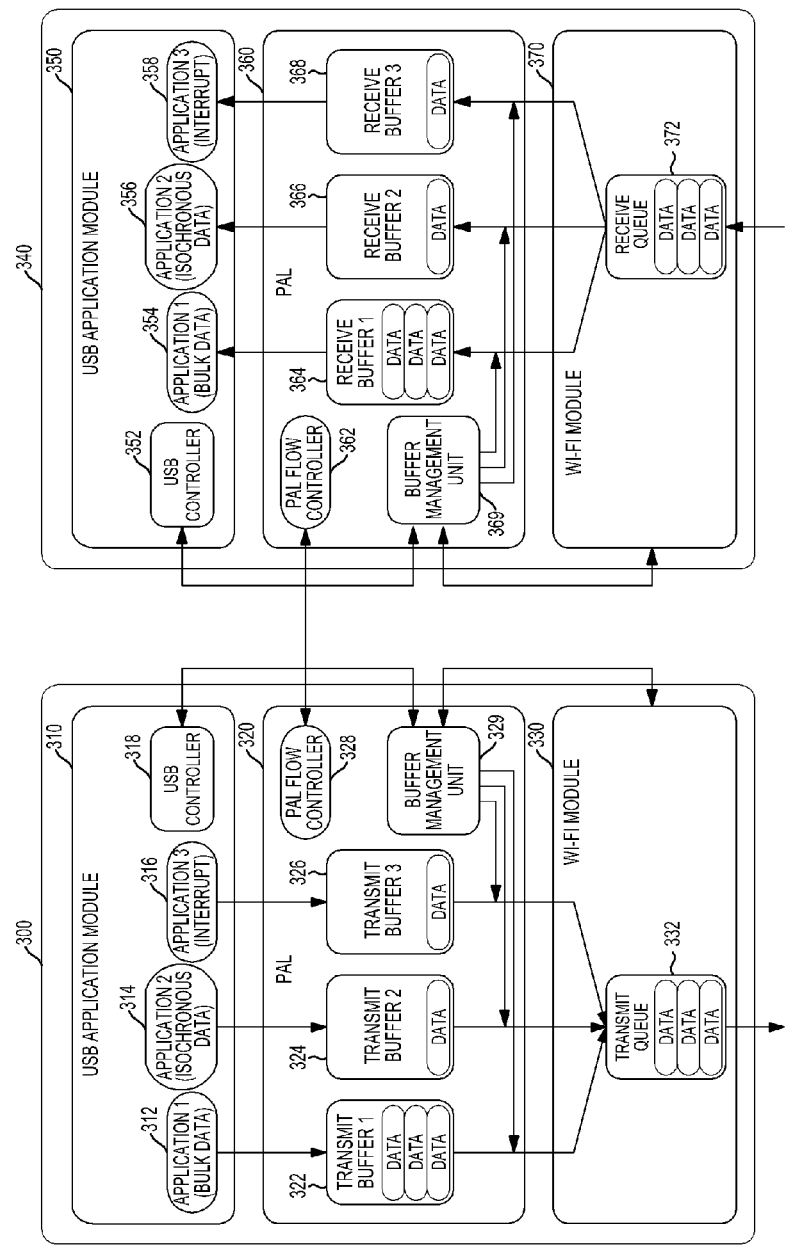

[Fig. 4]
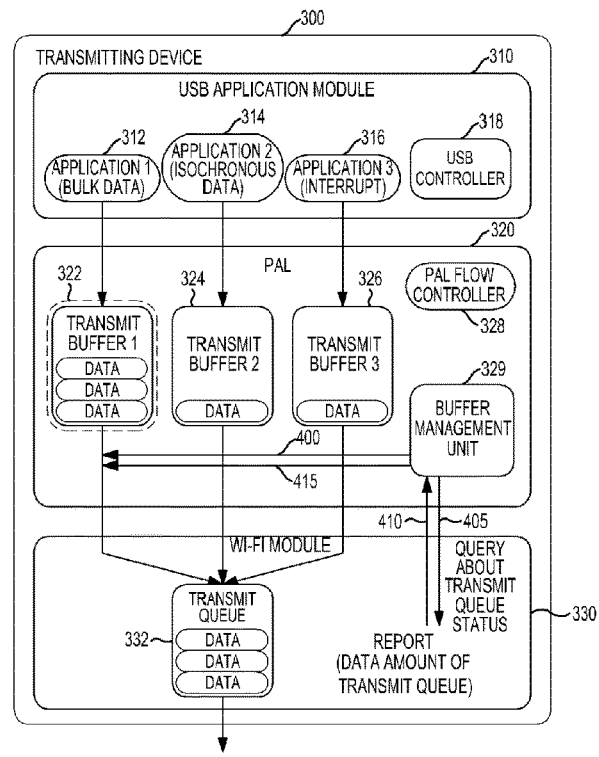
[Fig. 5]
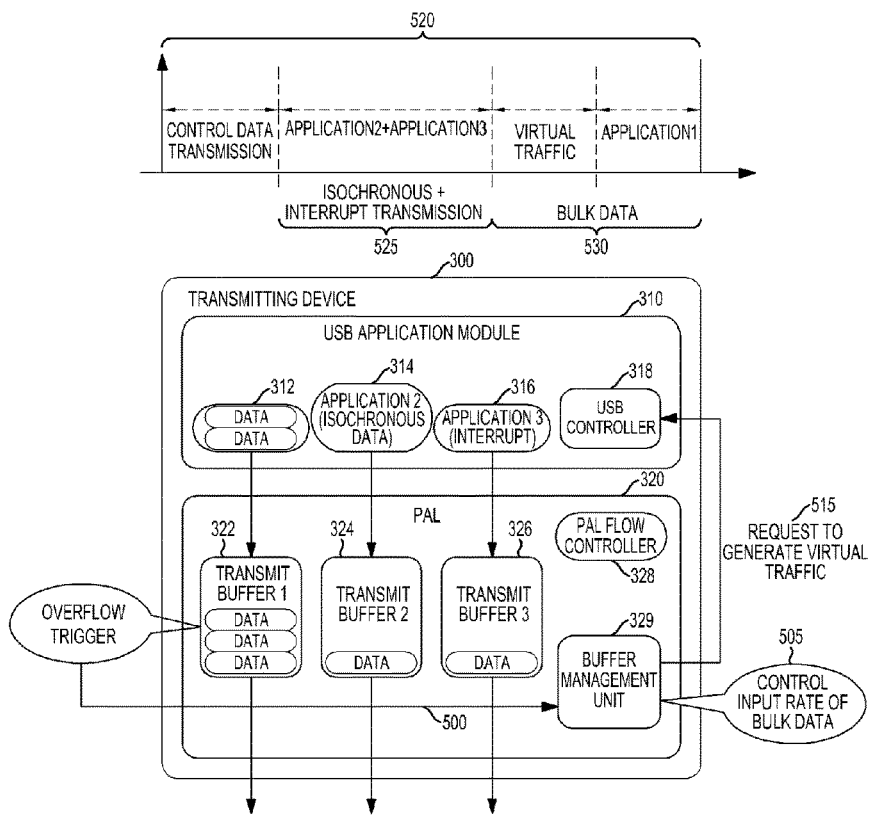

[Fig. 6a]
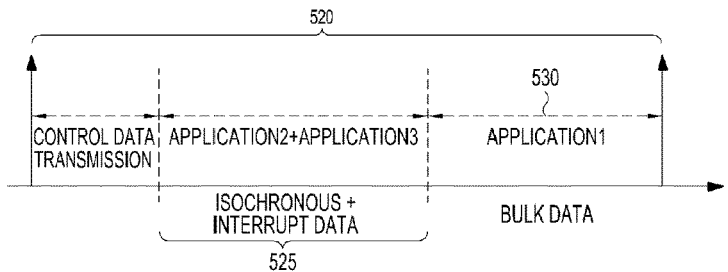
[Fig. 6b]
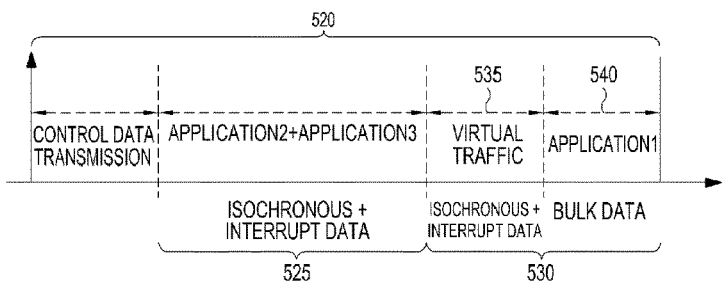
[Fig. 7]
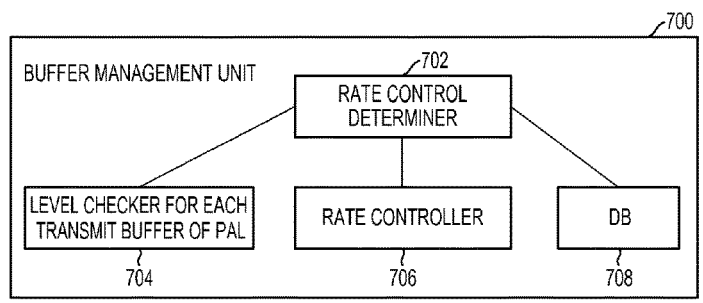
[Fig. 8]
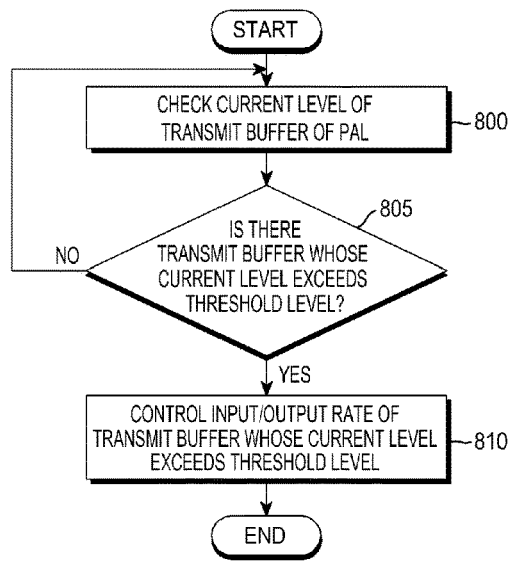

[Fig. 9a]
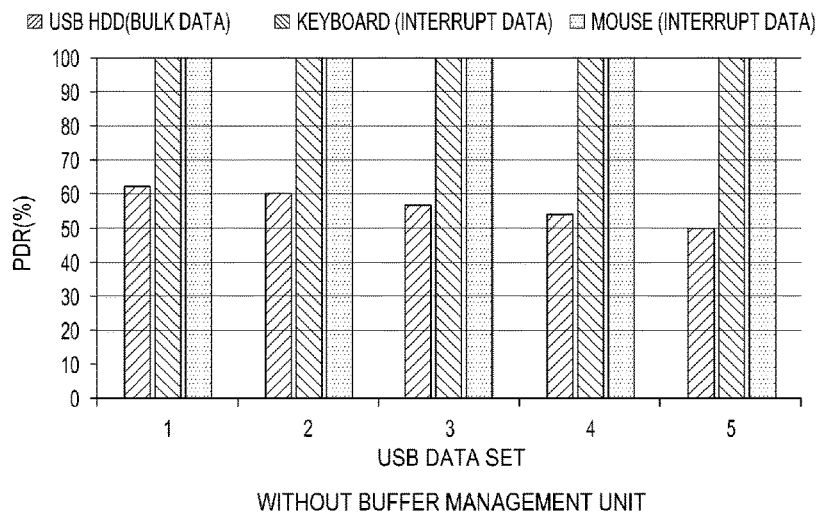
WITHOUT BUFFER MANAGEMENT UNIT
[Fig. 9b]
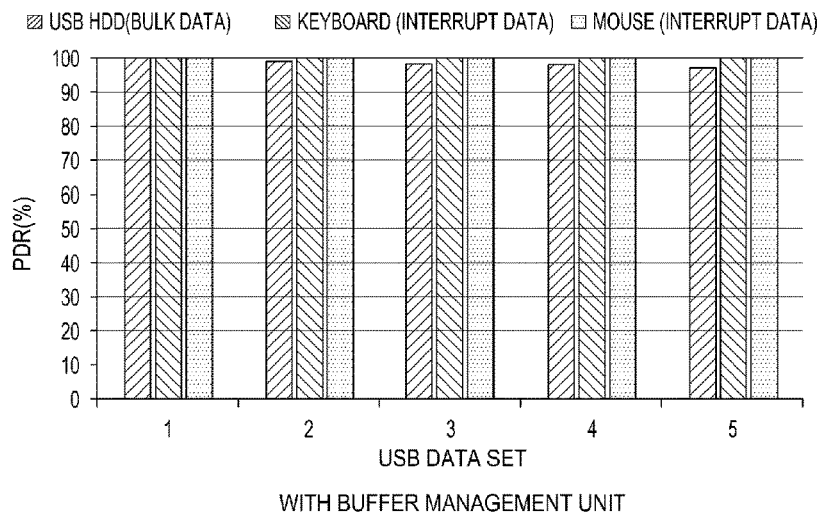
WITH BUFFER MANAGEMENT UNIT
[Fig. 10a]
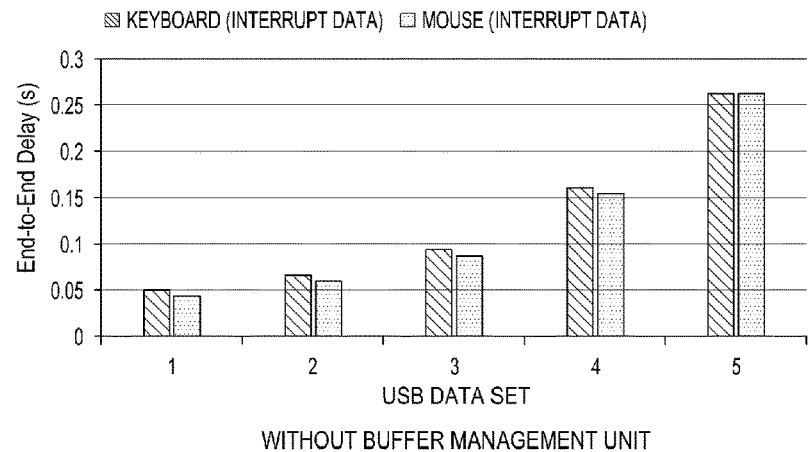
WITHOUT BUFFER MANAGEMENT UNIT

[Fig. 10b]
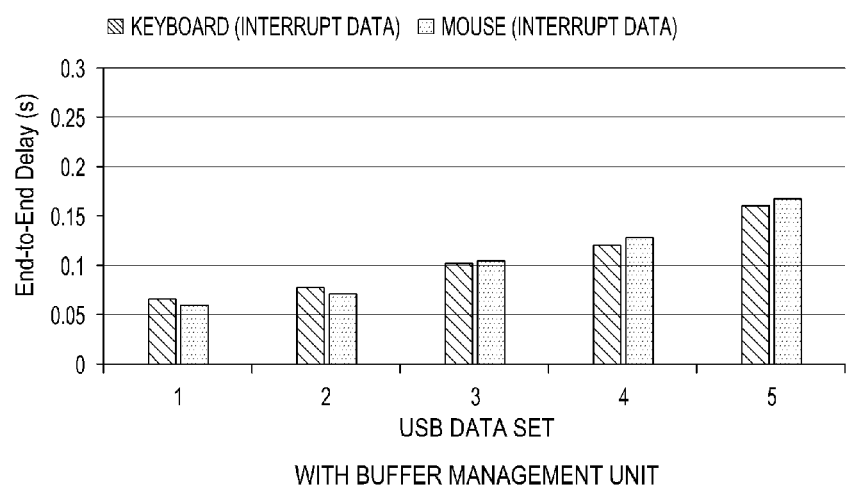

BUFFER MANAGEMENT METHOD AND APPARATUS FOR UNIVERSAL SERIAL BUS COMMUNICATION IN WIRELESS ENVIRONMENT

PRIORITY

This application is a National Phase Entry of PCT International Application No. PCT/KR2014/001174, which was filed on Feb. 13, 2014, and claims priority to Korean Patent Application No. 10-2013-0131486, which was filed on Oct. 31, 2013, the contents of each of which are incorporated herein by reference.

TECHNICAL FIELD

The present disclosure relates to a buffer management method and apparatus for Universal Serial Bus (USB) communication in a wireless environment.

BACKGROUND ART

A typical Universal Serial Bus (USB) communication system includes a USB host and a USB device that may directly communicate with the USB host. USB communication as used herein may be defined as connection between the USB host and USB device. The connection may be multi-tiered with multiple hubs for the USB host. Even in this case, the USB host is directly connected to the USB device.

If the USB communication is performed in a wired environment, it uses predetermined fixed bandwidth exclusively and thus has slim chance of a collision with neighboring devices and an occurrence of packet drop.

On the other hand, if the USB communication is performed in a wireless environment, the wireless environment, e.g., Wireless Fidelity (Wi-Fi) cannot guarantee a fixed bandwidth for the USB communication because all the neighboring devices share the bandwidth in the wireless communication. Thus, the wireless USB communication is more likely to suffer from packet loss due to collision and interference with neighboring devices and packet overflow from a Wi-Fi queue.

The above information is presented as background information only to assist with an understanding of the present disclosure. No determination has been made, and no assertion is made, as to whether any of the above might be applicable as prior art with regard to the present disclosure.

DISCLOSURE OF INVENTION

Technical Problem

Accordingly, a need exists for a method for reducing packet loss of USB communication in a wireless environment.

Solution to Problem

The present disclosure provides a buffer management method and apparatus for reducing packet loss of USB communication in a wireless environment.

In accordance with an aspect of the present disclosure, provided is a method for managing buffers of a device for Universal Serial Bus (USB) communication in a wireless environment. The method includes determining respective current data storage levels of transmit buffers that store different types of data for USB communication; comparing the respective current data storage levels of the transmit buffers with corresponding respective predetermined threshold levels; and controlling an input rate or output rate of a first transmit buffer if it is determined based on the comparison that the first transmit buffer has a current data storage level that exceeds a corresponding predetermined threshold level.

In accordance with another aspect of the present disclosure, provided is an apparatus for managing buffers of a device for Universal Serial Bus (USB) communication in a wireless environment. The apparatus includes a determiner for determining respective current data storage levels of transmit buffers that store different types of data for USB communication; and a controller configured to compare the respective current data storage levels of the transmit buffers with corresponding respective predetermined threshold levels and control an input rate or output rate of a first transmit buffer if it is determined based on the comparison that the first transmit buffer has a current data storage level that exceeds a predetermined threshold level.

Other aspects, advantages, and salient features of the disclosure will become apparent to those skilled in the art from the following detailed description, which, taken in conjunction with the annexed drawings, discloses exemplary embodiments of the disclosure

BRIEF DESCRIPTION OF DRAWINGS

The above and other features and advantages of the present disclosure will become more apparent by describing in detail exemplary embodiments thereof with reference to the attached drawings in which:

FIG. 1 illustrates a general Universal Serial Bus (USB) communication system based on a wireless environment;

FIG. 2 illustrates devices for wireless USB communication in a related art;

FIG. 3 illustrates devices for wireless USB communication, according to an embodiment of the present disclosure;

FIG. 4 illustrates operations of a transmitting device for wireless USB communication, according to an embodiment of the present disclosure;

FIG. 5 illustrates operations of a transmitting device for wireless USB communication, according to another embodiment of the present disclosure;

FIGS. 6a and 6b illustrate controlling input rates of a transmit buffer of a Protocol Adaptation Layer (PAL) with a virtual traffic, according to an embodiment of the present disclosure;

FIG. 7 is a schematic block diagram illustrating a buffer management unit, according to an embodiment of the present disclosure;

FIG. 8 is flowchart illustrating operations of a buffer management unit, according to an embodiment of the present disclosure;

FIGS. 9a and 9b show graphs about Packet Delivery Ratio (PDR) in USB communication of a device, depending on whether or not a buffer management unit is applied, according to embodiments of the present disclosure; and FIGS. 10a and 10b show graphs about transfer time delay of interrupt data in USB communication of a device, depending on whether or not a buffer management unit is applied according to embodiments of the present disclosure.

Throughout the drawings, like reference numerals will be understood to refer to like parts, components, and structures.

BEST MODE FOR CARRYING OUT THE INVENTION

The disclosure now will be described more fully hereinafter with reference to the accompanying drawings, in which illustrative embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~and/or~," or the like.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a general Universal Serial Bus (USB) communication system based on a wireless environment.

Referring to FIG. 1, a USB communication system 100 may include a USB host 105, multiple USB hubs that support wireless communication between the USB host 105 and USB devices, such as a USB hub 1-n 115a-115n, and multiple USB devices connected to the USB hubs 1-n 115a-115n.

The USB devices may include e.g., keyboards, mice, USB-Hard Disk Drives (USB-HDDs), etc.

In the USB communication system, USB communication may include delivering data originated from the USB host 105 to a USB device via wireless communication, and delivering data originated from a USB device to the USB host 105 via wireless communication.

FIG. 2 illustrates devices for wireless USB communication in a related art.

Referring to FIG. 2, device 1 200 may be a transmitting device for USB communication, which may be, for example, the USB host 105 or a USB device from which data for USB communication is originated, as shown in FIG. 1. Device 2 240 may be a receiving device for the USB communication, which may be, for example, the USB host 105 or a USB device at which data for USB communication receives, as shown in FIG. 1.

The device 1 200 may mainly include an application module 210, a Protocol Adaptation Layer (PAL) 220, and a Wireless Fidelity (Wi-Fi) module 230.

The application module 210 may include applications that generate various types of data for USB communication, e.g., applications 1, 2, and 3 212, 214, and 216, and a USB controller 218. In general, there are four types of data transmitted or received in the USB communication: control data, bulk data, interrupt data, and isochronous data. The control data may refer to data for information exchanges for connection between an end device and a USB host and data transfer. The bulk data may be used in transmitting a mass file irrespective of time and transfer timing. Transfer rate of the bulk data may remain nearly 100% to guarantee data integrity. As a method for transferring the bulk data, a scheme to gradually increase data transfer rate as the data transfer succeeds is used. Accordingly, the data transfer rate may vary over time, which may make it difficult to guarantee wireless resources for the bulk data in a wireless environment. Hard Disk Drive (HDD) file transfer for a USB HDD may be the case of an ordinary bulk data transfer of a USB device.

The interrupt data is used in transferring data when inputs or outputs of a particular device are produced periodically. Certain data transfer rate of the interrupt data may be guaranteed to respond quickly to a particular event, and the transfer time of the interrupt data may be as short as possible. However, the amount of instantaneous interrupt data is very little. The interrupt data may be mainly applied to keyboards, mice, game controllers, etc., among other USB devices.

Lastly, the isochronous data may be used to periodically transfer real-time camera images, videos, etc., and a little of data loss may be accepted to guarantee the user experience. The isochronous data is to be transferred periodically within a particular time. If it is not the case, discontinuity in streaming images, buffering problem, etc., may occur. Transfer method for the isochronous data may be applied in webcams.

As a specific example, the application 1 212 may generate bulk data, the application 2 214 may generate isochronous data, and the application 3 216 may generate interrupt data. The USB controller 218 may then control data generated by the respective applications 1 to 3 212, 214, and 216 to be sent into buffers of the PAL 220 that store different types of data. The PAL 220 may include transmit buffers for storing data by classifying it by data types for USB communication and a flow controller 228. For example, the transmit buffers may include a transmit buffer 1 222 for storing bulk data generated by the application 1 212, a transmit buffer 2 224 for storing isochronous data generated by the application 2 214, and a transmit buffer 3 226 for storing interrupt data generated by the application 3 216. The flow controller 228 may control respective data stored in the transmit buffers 1, 2, and 3 222, 224, and 226 to be finally delivered to receive buffers 1, 2, and 3 264, 266, and 268 through a transmit queue 232 of the Wi-Fi module 230.

If determining that current data amount stored in the transmit queue 232 has reached to a threshold, the Wi-Fi module 230 including the transmit queue 232 may convert data into a proper form for wireless transmission such that the respective data may be sent wirelessly to a receiving device, e.g., the device 2 240. For convenience of explanation, it is assumed herein that Wi-Fi technologies are applied to embodiments of the present disclosure, as will be discussed below. The transmit queue 232 is herein illustrated to have a single buffer. Unlike transmit buffers, the transmit queue 232 may store incoming data without need for classifying it by data types.

Similarly to the device 1 200, the device 2 240 may also mainly include an application module 250, a PAL 260, and a Wi-Fi module 270.

The Wi-Fi module 270 may include a receive queue 272 for storing data sent from the transmit queue 232 of the Wi-Fi module 230 in the device 1 200. The receive queue 272 may forward the data to corresponding receive buffers 1, 2, and 3 264, 266, and 268 of the PAL 260 by data types. If determining that the amount of data stored in each of the receive buffers 1, 2, and 3 264, 266, and 268 exceeds a corresponding threshold, a flow controller 262 included in the PAL 260 may output the data to a mapped application included in the USB application module 250. A USB controller 252 included in the USB application module 250 may control the device 2 240 to perform a function corresponding to the data outputted to each of the application 1, 2, and 3 254, 256, and 258.

However, there is no specific control scheme for data passed from the transmit buffers 1, 2, and 3 222, 224, and 226 of the PAL 220 to the transmit queue 232 of the Wi-Fi module 230. Thus, the transmit queue 232 has higher chance of overflow.

Due to this device structure, the conventional USB communication has a problem with the fall in Packet Delivery Ratio (PDR). Therefore, for a device for USB communication, a specific scheme for controlling data to be sent from buffers included in a PAL of the device to a transmit queue of a Wi-Fi module is desired.

Accordingly, the present disclosure provides a method and apparatus for controlling input and output rates of transmit buffers included in a PAL of a device at a transmitting end or receiving end for USB communication, in order to increase PDR in a USB system based on wireless environments.

In an embodiment of the present disclosure, a method for preventing an overflow from a queue in a Wi-Fi module of a device for USB communication is provided. For this, a buffer management unit is introduced to control an amount (i.e., output rates) of data outputted from transmit buffers of the PAL that store different types of data to a queue of the Wi-Fi module in the device at a transmitting end for USB communication. The buffer management unit may be implemented as hardware added to the PAL or as software executed by an existing flow controller. The buffer management unit equipped in the PAL may query a current data storage level that indicates the amount of data stored in the queue of the Wi-Fi module, before delivering data stored in transmit buffers.

Based on the query results, the buffer management unit may control an output rate of the data stored in the transmit buffer being outputted to the queue of the Wi-Fi module. Such control operations will be described in detail later with reference to FIG. 4.

In another embodiment of the present disclosure, a method for preventing an overflow from buffers of a PAL in a device for USB communication is provided. With the method, the amount, i.e., input rates of data inputted to transmit buffers of a PAL from a USB application module of a device at a transmitting end for USB communication is controlled. The method may also be implemented by the buffer management unit as introduced earlier. The buffer management unit in the PAL of the embodiment may query a current data storage level of a transmit buffer that stores bulk data among other buffers in the PAL. Based on the query result, the buffer management unit may send a request to generate virtual traffic to the USB application module. With the virtual traffic generated on the request, resources for the bulk data is preoccupied and then input rates of the transmit buffer in the PAL that stores the bulk data may be controlled.

FIG. 3 illustrates devices for wireless USB communication, according to an embodiment of the present disclosure.

Referring to FIG. 3, a device 1 300 and device 2 340 correspond to a transmitting device and receiving device, respectively, which may be the device 1 200 and device 2 240 of FIG. 2. Compared with the device 1 200, the device 1 300 may further include a buffer management unit for controlling the transfer amount of data inputted/outputted from/to a transmit buffer of a PAL 320. While the buffer management unit is illustrated as a separate element of the PAL 320 in this embodiment, a flow controller included in the PAL 320 may take over the control operations of the buffer management unit without separate implementation of the buffer management unit in other embodiments. Other elements than the buffer management unit 329 of the device 1 300 and buffer management unit 369 of the device 2 340 operate the same as corresponding elements of the device 1 200 and device 2 240 of FIG. 2, thus description of which will be omitted herein.

FIG. 4 illustrates operations of a transmitting device for wireless USB communication, according to an embodiment of the present disclosure. For convenience of explanation, assume that the transmitting device shown in FIG. 4 is the device 1 300 of FIG. 3. The buffer management unit 329 may determine whether a current data storage level of each transmit buffer indicating the storage amount of data inputted from the USB application module 310 is greater than a predetermined threshold level of the transmit buffer. The predetermined threshold level may indicate that the data storage amount of the transmit buffer reaches the point where the data is to be outputted to the Wi-Fi module 330.

The transmit buffers that each store a different type of data have respective threshold levels determined in advance.

Referring to FIG. 4, in step 400, it is assumed that the buffer management unit 329 determines that the data storage amount of the transmit buffer 1 322 that stores bulk data for USB communication is greater than the threshold level of the transmit buffer 1. In step 405, the buffer management unit 329 may send a query about a status of the transmit queue 332 of the Wi-Fi module 330 to the Wi-Fi module 330. In step 410, the Wi-Fi module 330 may respond with a level indicating the amount of data currently stored in the transmit queue 332. The buffer management unit 329 may be aware of a highest amount of data that the transmit queue 332 of the Wi-Fi module 330 may store and respective data storage amounts that correspond to respective levels of the transmit queue 332. In step 415, the buffer management unit 329 may figure out a data amount that corresponds to the level responded in step 410 and determine how much data may be stored more in the transmit queue 332 till the highest amount of data. The buffer management unit 329 may determine an output rate of data to be outputted from the transmit buffer 1 322 to the transmit queue 332 according to the data amount that may be additionally stored in the transmit queue 332.

FIG. 5 illustrates operations of a transmitting device for wireless USB communication, according to another embodiment of the present disclosure. For convenience of explanation, assume that the transmitting device shown in FIG. 5 is the device 1 300 of FIG. 3.

Referring to FIG. 5, in step 500, it is assumed that the buffer management unit 329 is aware that an overflow trigger has occurred from the transmit buffer 1 322 included in the PAL 320. In embodiments of the present disclosure, there may be two cases where the overflow trigger occurs.

First, if a current (data storage) level indicating the current storage amount of data sent from the USB application module 310 to each of the transmit buffers in the PAL 320 that store different types of data exceeds a predetermined threshold level, the buffer management unit 329 may determine that an overflow trigger has occurred from the transmit buffer and control the input rate of data to the transmit buffer from a corresponding application in the USB application module 310. The transmit buffers that each store a different type of data are used to deliver the data to the Wi-Fi module 330 and have respective threshold levels determined in advance. Each of the threshold levels for the transmit buffers may be set to be a value that corresponds to a USB superframe pre-allocated for data stored in the transmit buffer. Referring to FIG. 5, an entire superframe 520 for USB communication may be divided into a sub-frame for control data transmission, a sub-frame for the applications 2 and 3, i.e., for isochronous and interrupt data transmission, and a sub-frame for the application 1, i.e., for bulk data transmission.

In another embodiment, in order to increase a packet loss rate of bulk data, otherwise 100% of data transfer rate of which may be secured, the buffer management unit 329 may monitor a current level of the transmit buffer 1 322 that stores bulk data for USB communication. If the buffer management unit 329 is aware that the current level of the transmit buffer 1 322 exceeds the threshold level, it may control an input rate of bulk data from the application 1 to the transmit queue 332 through the transmit buffer 1 322. In embodiments of the present disclosure, the buffer management unit 329 may determine a predetermined input rate for each level of the transmit buffer 1 322 and accordingly control the current input rate of the transmit buffer 322. For example, the level of the transmit buffer 1 322 may be divided into one or more sub-levels with the same or different gaps between '0' level of data storage amount and a highest level of data storage amount. If the highest level of data storage amount of the transfer buffer 1 322 is '100', there may be four sub-levels, each being increased by '25'. Specifically, sub-level 1 may include a range between 0 and 25; sub-level 2 may include a range between 25 and 50; and sub-level 3 may include a range between 50 and 75. Then, an input rate of the transmit buffer to be controlled for each sub-level may be determined.

For example, data storage amounts of the transmit buffer may be classified to be 0<sub-level 1<sub-level 2<sub-level 3<highest level. If the current level queue_1 of the transmit buffer i corresponds to the sub-level 1 queue_th1 or the sub-level 2 queue_th2, input rate of the transmit buffer i may be halved, and if the current level queue_1 exceeds the sub-level 2 queue_th2, input rate of the transmit buffer i may be decreased to a quarter of the current input rate.

Second, if a level of each transmit buffer that stores a different type of data, which is expected for a next cycle using a filling rate of the transmit buffer, satisfies the highest value corresponding to the size of the transmit buffer, the buffer management unit 329 may determine that an overflow trigger has occurred from the transmit buffer and control the input rate of data to the transmit buffer from a corresponding application in the USB application module 310. Specifically, the buffer management unit 329 may expect a level of the transmit buffer i for a corresponding cycle, according to Equation 1 using input and output rates of the transmit buffer i.

$$\text{If queue\_}i+(IR\_i-OR\_i)*T>\text{queue\_}i(\text{Max}), \text{ then control of input rate is determined,} \quad \text{Equation 1}$$

where i represents an identifier of the transmit buffer, and queue_i represents a current level of the transmit buffer i. IR_i represents an input rate of the transmit buffer i, and OR_i represents an output rate of the transmit buffer i. T represents time of an expected cycle. queue_i(Max) represents a highest data amount that the transmit buffer i may store, i.e., the size of the transmit buffer i.

As a result, once the filling rate of the transmit buffer I, queue_i+(IR_i−OR_i)*T is calculated, the buffer management unit 329 may compare the filling rate of the transmit buffer i with the highest data amount that the transmit buffer i may store, queue_i(Max). If the filling rate of the transmit buffer i exceeds the queue_i(Max), the buffer management unit 328 may determine an input rate of data being sent from a corresponding application to the transmit buffer i not to exceed the highest data storage amount of the transmit buffer i.

If any of the two cases as mentioned above are met, the buffer management unit 329 may determine that an overflow trigger has occurred. In step 505, the buffer management unit 329 may determine to control an input rate of the bulk data being inputted from the application 1 312 to the transmit buffer 1 322 from which the overflow trigger has occurred.

In step 515, the buffer management unit 329 may send a request to generate virtual traffic to the USB controller 318 that controls the USB application module 310. In a general method for allocating resources for USB communication, as resources, some frames 525 are allocated first for isochronous data and interrupt data and the remaining frames 530 are allocated for bulk data.

As such an overflow trigger occurs, the input rate of the transmit buffer 1 322 may be controlled to be decreased.

FIGS. 6a and 6b illustrate controlling input rates of a transmit buffer of a PAL using virtual traffic, according to an embodiment of the present disclosure. A target buffer, which is e.g., the transmit buffer 1 322, whose input rate is to be controlled, is a buffer for bulk data. As discussed earlier, referring to FIG. 6a, in the general method for allocating resources for USB communication, a entire superframe 520 may be divided into a sub-frame for control data, a sub-frame for isochronous data and interrupt data, and a sub-frame for bulk data. Referring to FIG. 6b, when the USB controller 318 generates virtual traffic for data and interrupt data on request, the USB controller 318 may allocate some frames 535 of frames 530 for bulk data for isochronous data and interrupt data according to the general method for allocating resources for USB communication, and thus the frames for bulk data is reduced to the frames 540. With the reduction of the resource for bulk data to the frames 540, an input rate of data being inputted to the transmit buffer 1 312 from the application 1 may be decreased.

The buffer management unit 329 may send a request to eliminate the virtual traffic to the USB controller 318 if determining that the transmit buffer 1 322 has lower chance of overflow. If the USB controller 318 eliminates the virtual traffic, input rate of the transmit buffer 1 322 may be recovered to its original input rate.

FIG. 7 is a schematic block diagram illustrating a buffer management unit, according to an embodiment of the present disclosure. For convenience of explanation, the buffer management unit is herein illustrated to have individual function units, which may be combined or sub-divided depending on implementations in other embodiments. The buffer management unit may also be implemented separately within the PAL of a transmitting device, or the function of the buffer management unit may be implemented to be incorporated into existing flow control.

Referring to FIG. 7, the buffer management unit 700 may include a rate control determiner 702, a level checker for each transmit buffer of a PAL, a rate controller 706, and a DataBase (DB) 708.

The DB 708 may include information for managing overflows of transmit buffers of the PAL. For example, the DB 708 may include e.g., threshold levels each indicating that the storage data amount of each transmit buffer reaches a point where the data is to be outputted from the transmit buffer, and a highest storage amount of data that the Wi-Fi module may store.

The level checker for each transmit buffer of the PAL 704 may determine the respective current levels of data amount stored in transmit buffers of the PAL that store different types of data for USB communication. Then, the level checker for each transmit buffer of the PAL 704 may compare the current level of each transmit buffer with its predetermined threshold level, and send the comparison result to the rate control determiner 702. Based on the comparison result, the rate control determiner 702 may control an output rate of the transmit buffer whose current data storage level exceeds its predetermined threshold level, according to a first embodiment of the present disclosure. Alternatively, the rate control determiner 702 may control an input rate of the buffer whose current data storage level exceeds its predetermined threshold level, according to a second embodiment of the present disclosure. Operations of the buffer management unit according to the first and second embodiments correspond to what were described in connection with FIGS. 4 and 5, respectively, so the detailed description of which will be omitted herein.

FIG. 8 is flowchart illustrating operations of a buffer management unit, according to an embodiment of the present disclosure. For convenience of explanation, assume that operations of the flowchart of FIG. 8 are performed by the buffer management unit of FIG. 7.

Referring to FIG. 8, in step 800, the level checker for each transmit buffer of the PAL 704 may determine the current storage level of each transmit buffer of the PAL, and send the check results to the rate control determiner 702. In step 805, the rate control determiner 702 may determine whether there is any transmit buffer whose current data storage level exceeds its threshold level by comparing the current data storage level of each transmit buffer with its threshold level. If there is any transmit buffer whose current data storage level exceeds its threshold level, in step 810, the rate controller 706 may control an output rate of the transmit buffer whose current data storage level exceeds its predetermined threshold level, according to a first embodiment of the present disclosure. Alternatively, the rate control determiner 702 may control an input rate of the buffer whose current data storage level exceeds its predetermined threshold level, according to a second embodiment of the present disclosure. Operations of the buffer management unit according to the first and second embodiments correspond to what were described in connection with FIGS. 4 and 5, respectively, so the detailed description of which will be omitted herein.

According to the present disclosure, packet loss rate may be advantageously reduced by preventing overflow from a buffer that stores data generated by each USB application in a device for USB communication to be sent to a Wi-Fi module. Also, success rate of data transfer may be increased for bulk data, transfer stability of which is considered more important than other data for USB communication.

To show this more specifically, FIGS. 9a and 9b show graphs about Packet Delivery Ratio (PDR) in USB communication of a device, depending on whether or not a buffer management unit is applied according to embodiments of the present disclosure.

Referring to FIG. 9b, it is seen that PDR of bulk data obtained by applying the buffer management unit according to an embodiment of the present disclosure is much higher than PDR of bulk data with no buffer management unit applied as shown in FIG. 9a.

In addition, according to the present disclosure, transfer time delay of isochronous data and interrupt data may be decreased by controlling the rate of bulk data.

To show this more specifically, FIGS. 10a and 10b show graphs about transfer time delay of interrupt data in USB communication of a device, depending on whether or not a buffer management unit is applied according to embodiments of the present disclosure.

Referring to FIG. 10b, it is seen that transfer time delay of interrupt data becomes significantly short, compared with what is shown in FIG. 10a where the buffer management unit is not employed, as the data amount for USB communication increases.

According to the embodiments of the present disclosure, in a device for USB communication, PDR may be improved by reducing a chance of overflows from a transmit buffer of the PAL that store different types of data inputted from the USB application module to be outputted to the Wi-Fi module; and transfer rate of bulk data and the remaining data may also be increased by controlling the rate of the bulk data, data stability of which is considered relatively important.

Several embodiments have been described in connection with e.g., mobile communication terminals, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

The invention claimed is:

1. A method for managing buffers of a device for universal serial bus (USB) communication in a wireless environment, the method comprising:
    determining a first data storage level of a first buffer that store a first data for the USB communication;
    determining a second data storage level of a second buffer that stores a second data for the USB communication;
    comparing the first data storage level with a first threshold level; and
    comparing the second data storage level with a second threshold level, wherein the first threshold value and the second threshold value are determined independently;
    controlling an input rate or output rate of at least one of the first buffer and the second buffer based on the comparing, by controlling one of an input rate of data being inputted to at least one of the first buffer and the second buffer from a USB application module and an output rate of data being outputted to a queue of a protocol module for wireless communication.

2. The method of claim 1, wherein controlling an input rate or output rate of a first buffer comprises sending a query about a status of the queue to a Wireless-Fidelity (Wi-Fi) module that has the queue, if the first data storage level of the first buffer exceeds the first threshold level; and controlling an output rate of the first buffer based on the status of the queue received in return for the query, wherein the first threshold level indicates that a data storage amount of the first buffer reaches a point where data of the first buffer is to be outputted.

3. The method of claim 2, wherein controlling an output rate of the first buffer comprises determining a data amount allowed to be additionally stored in the queue based on the status of the queue, and controlling the output rate of the first buffer based on the data amount.

4. The method of claim 1, wherein controlling an output rate of the first buffer comprises:

determining a data amount that the first buffer stores;

sending a request to generate virtual traffic to the USB application module if the input rate of the first buffer is higher in relation to the data amount; and decreasing the input rate of the first buffer by allocating a part of resources for bulk data to resources for the virtual traffic.

5. The method of claim 4, wherein the virtual traffic comprises data corresponding to isochronous and interrupt data types.

6. The method of claim 4, wherein sending a request to generate virtual traffic to the USB application module comprises sending the request to generate virtual traffic to the USB application module even if a rate of filling the first buffer exceeds a highest data storage amount of the first buffer.

7. An apparatus for managing buffers of a device for universal serial bus (USB) communication in a wireless environment, the apparatus comprising:

a determiner configured to determine a first data storage level of a first buffer that stores a first data for the USB communication, and determine a second data storage level of a second buffer that stores a second data for the USB communication; and a controller configured to compare the first data storage level with a first threshold level, compare the second data storage level with a second threshold level, wherein the first threshold value and the second threshold value are determined independently, and control an input rate or output rate of at least one of the first buffer and the second buffer based on the comparing, by controlling one of an input rate of data being inputted to at least one of the first buffer and the second buffer from a USB application module and an output rate of data being outputted to a queue of a protocol module for wireless communication.

8. The apparatus of claim 7, wherein the rate controller is configured to send a query about a status of the queue to a Wireless-Fidelity (Wi-Fi) module that has the queue, if the first data storage level of the first buffer exceeds the first threshold level of the first buffer; and control an output rate of the first buffer based on the status of the queue received in return for the query, wherein the first threshold level indicates that a data storage amount of the first buffer reaches a point where data of the first buffer is to be outputted.

9. The apparatus of claim 8, wherein the rate controller is configured to determine a data amount allowed to be additionally stored in the queue based on the status of the queue, and control the output rate of the first buffer based on the data amount.

10. The apparatus of claim 7, wherein the rate controller is configured to determine a data amount that the first buffer stores with the determining unit;

send a request to generate virtual traffic to the USB application module if an input rate of the first buffer is higher in relation to the data amount; and decrease the input rate of the first buffer by allocating a part of resources for bulk data to resources for the virtual traffic.

11. The apparatus of claim 10, wherein the virtual traffic comprises data corresponding to isochronous and interrupt data types.

12. The apparatus of claim 10, wherein the rate controller is configured to send the request to generate virtual traffic to the USB application module even if a rate of filling the first buffer exceeds a highest data storage amount of the first buffer.

* * * * *